(12) United States Patent
Wang et al.

(10) Patent No.: US 11,888,296 B2
(45) Date of Patent: Jan. 30, 2024

(54) DEVICE FOR PROCESSING AN ANTISTRESS CONE OF A MAIN INSULATION LAYER OF A CABLE

(71) Applicants: STATE GRID HUZHOU POWER SUPPLY COMPANY, Huzhou Zhejiang (CN); STATE GRID ZHEJIANG ELECTRIC POWER CO., LTD. DOUBLE INNOVATION CENTER, Hangzhou (CN)

(72) Inventors: Xiaojian Wang, Huzhou Zhejiang (CN); Zhen Chen, Huzhou Zhejiang (CN); Jing Xu, Huzhou Zhejiang (CN); Keqin Ye, Huzhou Zhejiang (CN); Wenhui Xu, Huzhou Zhejiang (CN); Weixun Qin, Huzhou Zhejiang (CN); Xinhang Chen, Huzhou Zhejiang (CN); Zhen Wang, Huzhou Zhejiang (CN); Xiaobin Shen, Huzhou Zhejiang (CN); Jie Chai, Huzhou Zhejiang (CN); Meng Tang, Huzhou Zhejiang (CN); Yongsheng Xu, Huzhou Zhejiang (CN); Feng Zhou, Huzhou Zhejiang (CN); Yudong Rui, Huzhou Zhejiang (CN)

(73) Assignees: State Grid Huzhou Power Supply Company, Zhejiang (CN); State Grid Zhejiang Electric Power Co., Ltd. Double Innovation Center, Zhejiang (CN)

( * ) Notice: Subject to any disclaimer, the term of this patent is extended or adjusted under 35 U.S.C. 154(b) by 659 days.

(21) Appl. No.: 16/950,770

(22) Filed: Nov. 17, 2020

(65) Prior Publication Data
US 2021/0376583 A1 Dec. 2, 2021

(30) Foreign Application Priority Data

May 28, 2020 (CN) .......................... 202010466264.1
May 28, 2020 (CN) .......................... 202020930657.9

(51) Int. Cl.
*H02G 1/12* (2006.01)
*H01B 13/00* (2006.01)
*H01B 7/20* (2006.01)

(52) U.S. Cl.
CPC ............. *H02G 1/1265* (2013.01); *H01B 7/20* (2013.01); *H01B 13/0003* (2013.01)

(58) Field of Classification Search
CPC .......... H02G 1/1265; H02G 1/14; H01B 7/20; H01B 13/0003; F16H 19/04;
(Continued)

(56) References Cited

U.S. PATENT DOCUMENTS

| 6,408,984 B1* | 6/2002 | Cavagnaro | E06C 7/44 |
| | | | 182/205 |
| 2014/0026718 A1* | 1/2014 | Ho | H02G 1/1265 |
| | | | 81/9.51 |

(Continued)

FOREIGN PATENT DOCUMENTS

| CN | 109728545 A | * | 5/2019 | ........... H02G 1/1265 |
| CN | 111064133 A | * | 4/2020 | ........... H02G 1/1265 |
| CN | 111350796 A | * | 6/2020 | ............. F16H 19/00 |

*Primary Examiner* — Ghassem Alie
(74) *Attorney, Agent, or Firm* — ArentFox Schiff LLP (57) ABSTRACT

Provided is a device for processing an antistress cone of a main insulation layer of a cable. The device includes a support, a clamping unit, a cutting unit and an infeed unit. The clamping unit is mounted on the support and configured to clamp a cable. The cutting unit is slidably disposed on the support, capable of cutting the cable in the radial direction of the cable, and capable of performing feeding in the radial direction of the cable to adjust the cutting depth. The infeed (Continued)

unit is connected to and capable of driving the cutting unit and configured to drive the cutting unit to slide in the axial direction of the cable so that the cutting unit performs feeding and cutting in the axial direction of the cable.

6 Claims, 6 Drawing Sheets

(58) Field of Classification Search
CPC ............. Y10T 83/0267; Y10T 83/0304; Y10T 83/0326; Y10T 83/0319
USPC ........ 83/872; 81/9.4, 9.51; 82/45, 56, 83, 85
See application file for complete search history.

(56) References Cited

U.S. PATENT DOCUMENTS

2018/0090918 A1* 3/2018 Houser .................. H02G 1/127
2020/0313450 A1* 10/2020 Lin ......................... H04M 1/04

\* cited by examiner

DEVICE FOR PROCESSING AN ANTISTRESS CONE OF A MAIN INSULATION LAYER OF A CABLE

CROSS-REFERENCE TO RELATED APPLICATION(S)

This application claims priority to Chinese Patent Applications No. 202010466264.1 filed May 28, 2020 and No. 202020930657.9 filed May 28, 2020, the disclosures of which are incorporated herein by reference in their entireties.

TECHNICAL FIELD

The present disclosure relates to the field of cable processing, for example, relates to a device for processing an antistress cone of a main insulation layer of a cable.

BACKGROUND

High-voltage direct-current transmission has the advantages of high transmission efficiency and low energy loss. Due to being more economical than alternating-current transmission, high-voltage direct-current transmission is widely used in long-distance or ultra-long-distance power transmission. Limited by the manufacturing technique of high-voltage cables, a jointless high-voltage cable manufactured has a maximum length of 10 kilometers. When ultra-long-distance power transmission is required, joints of individual cables need to be processed so as to connect these cables. At a joint of a cable, two different insulation materials, cable body insulation material and additional insulation material, are used. The electric field distribution at the joint is different from the electric field distribution of the cable body. Consequently, a potential difference, that is, axial field strength or axial stress, is generated between two adjacent points in the same insulation layer. Therefore, it is usual practice to cut an insulation layer closer to a connection end of a conductor to form a conical surface, namely an antistress cone, and then to wrap an increment insulator such that the two ends of the increment insulator form stress conical surfaces. A change in potential distribution on an insulation surface facilitates a uniform electric field and ensures the safety of a joint.

To ensure sufficient safety, the requirements for forming an antistress cone are relatively high. Currently, an antistress cone is generally manually formed by being cut with a glass sheet. Such method wastes time and energy, and the antistress cone processed using such method has a low quality and is difficult to standardize. Some devices that assist in manual cutting of antistress cones have emerged, but most of these devices are cumbersome and inefficient to operate and can play only an auxiliary role.

SUMMARY

The object of the present disclosure is to provide a device for processing an antistress cone of a main insulation layer of a cable. The device can automatically process the antistress cone, and the antistress cone formed using the device has a good quality.

The present disclosure provides the solution below.

A device for processing an antistress cone of a main insulation layer of a cable includes a support, a clamping unit, a cutting unit and an infeed unit.

The clamping unit is mounted on the support and configured to clamp a cable.

The cutting unit is slidably disposed on the support, capable of cutting the cable in the radial direction of the cable, and capable of performing feeding in the radial direction of the cable to adjust the cutting depth.

The infeed unit is connected to and capable of driving the cutting unit and configured to drive the cutting unit to slide in the axial direction of the cable so that the cutting unit performs feeding and cutting in the axial direction of the cable.

REFERENCE LIST 1 support
2 clamping unit
21 clamping holder
22 clamping jaw
23 clamping gear
24 clamping rack
25 rocker
26 lock bolt
3 cutting unit
30 cutting holder
31 driving assembly
311 first driver
312 second driver
313 planetary gear set
3131 planet carrier
3132 fixed gear
3133 ring gear
3134 planetary gear
3135 cutter driving gear
3136 rack
3137 gear shaft
314 power input gear
315 first transmission gear
316 second transmission gear
32 cutter
4 infeed unit 41 support base
42 infeed motor
43 lead screw
44 sliding block
45 slide rail
10 cable

DETAILED DESCRIPTION

The present disclosure will be further described in detail with reference to drawings and an embodiment. It is to be understood that the embodiment described herein is intended to illustrate and not to limit the present disclosure. It is to be noted that to facilitate description, only part, not all, of structures related to the present disclosure are illustrated in the drawings.

In the description of the embodiment of the present disclosure, unless otherwise expressly specified and limited, the term "connected to each other", "connected" or "secured" is to be construed in a broad sense as securely connected, detachably connected or integrated; mechanically connected or electrically connected; directly connected to each other or indirectly connected to each other via an intermediary; or intraconnected between two components or interactional between two components. For those of ordinary skill in the art, specific meanings of the preceding terms in the present disclosure may be understood based on specific situations.

In the present disclosure, unless otherwise expressly specified and limited, when a first feature is described as "on" or "below" a second feature, the first feature and the second feature may be in direct contact or may be in contact via another feature between the two features instead of being in direct contact. In addition, that the first feature is "on", "above" or "over" the second feature includes that the first feature is right above or obliquely above the second feature or just indicates that the horizontal level of the first feature is higher than the horizontal level of the second feature. That the first feature is "under", "below" or "beneath" the second feature includes that the first feature is right below or obliquely below the second feature or just indicates that the horizontal level of the first feature is lower than the horizontal level of the second feature.

In the description of the embodiment of the present disclosure, orientations or position relations indicated by terms such as "upper", "lower" and "right" are based on orientations or position relations shown in the drawings. These orientations or position relations are intended only to facilitate description and simplify operations and not to indicate or imply that a device or element referred to must have such specific orientations or must be configured or operated in such specific orientations. Thus, these orientations or position relations are not to be construed as limiting the present disclosure. In addition, the terms "first" and "second" are used only to distinguish between descriptions and have no special meaning.

Figure 1:
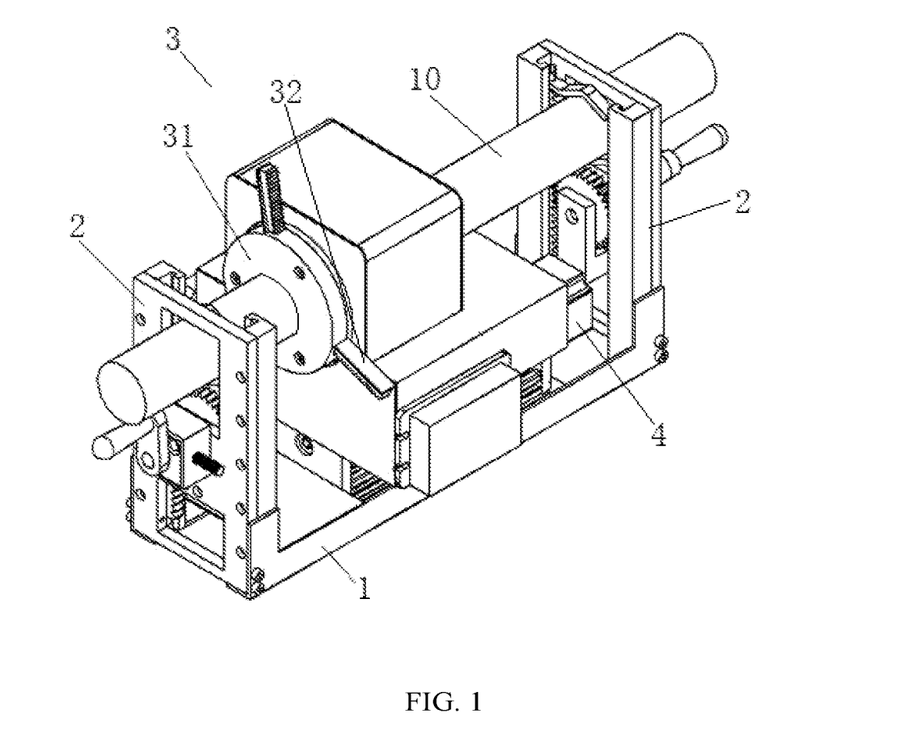
FIG. 1 is a perspective view illustrating the structure of a device for processing an antistress cone of a main insulation layer of a cable according to the present disclosure.
Figure 2:
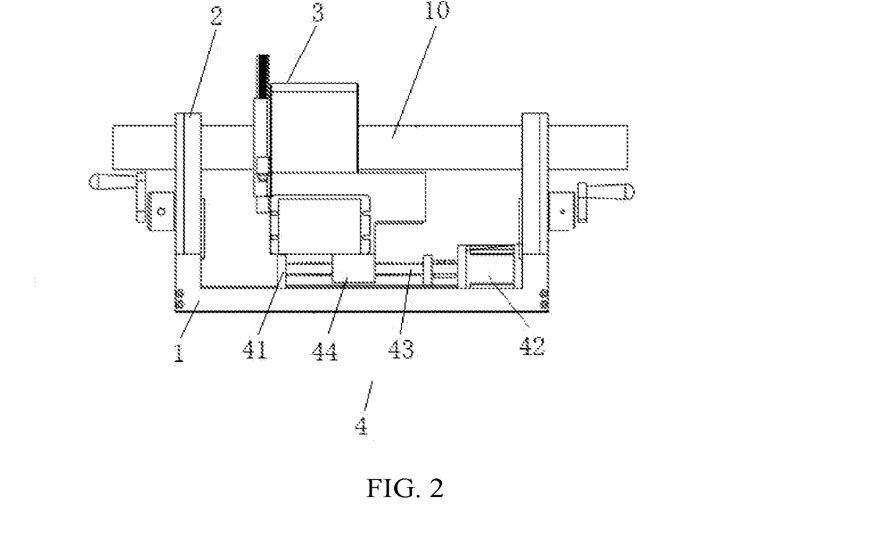
FIG. 2 is a side view of the device for processing an antistress cone of a main insulation layer of a cable according to the present disclosure.

The present disclosure provides a device for processing an antistress cone of a main insulation layer of a cable. The device can automatically process the antistress cone, and the antistress cone formed using the device has a good quality. Referring to FIG. 1 and FIG. 2, the device for processing an antistress cone of a main insulation layer of a cable includes a support 1, a clamping unit 2, a cutting unit 3 and an infeed unit 4. The clamping unit 2, the cutting unit 3 and the infeed unit 4 are mounted on the support 1.

Figure 3:
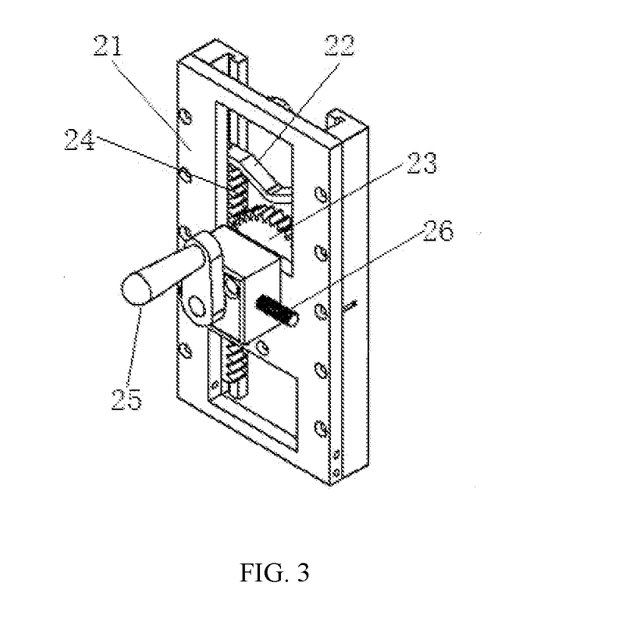
FIG. 3 is a perspective view illustrating the structure of a clamping unit according to the present disclosure.
Figure 4:
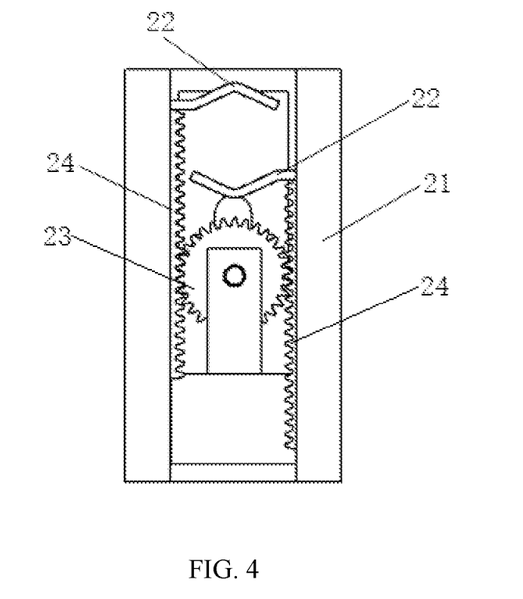
FIG. 4 is a front view of the clamping unit according to the present disclosure.
Figure 5:
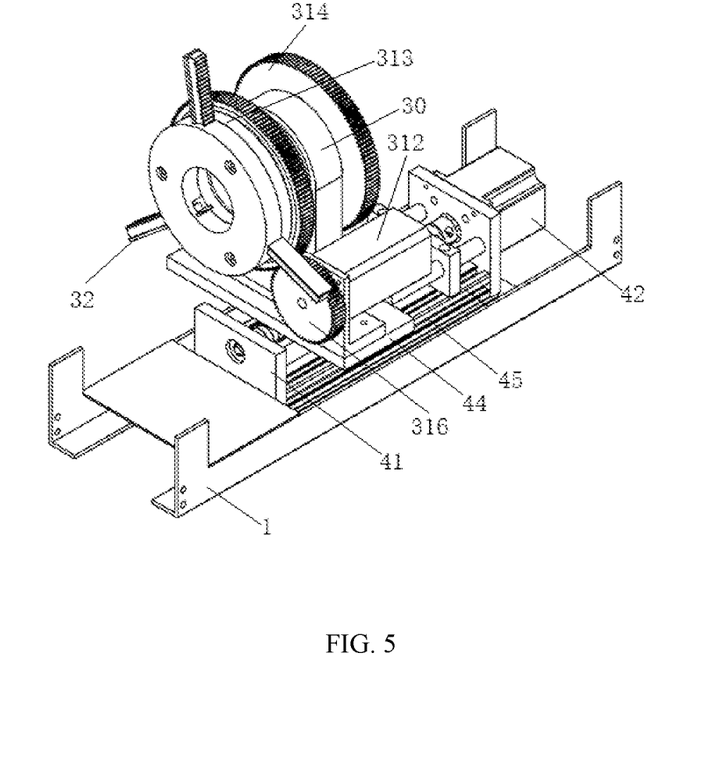
FIG. 5 is a schematic view illustrating the assembly structure of a cutting unit and an infeed unit according to the present disclosure.
Figure 6:
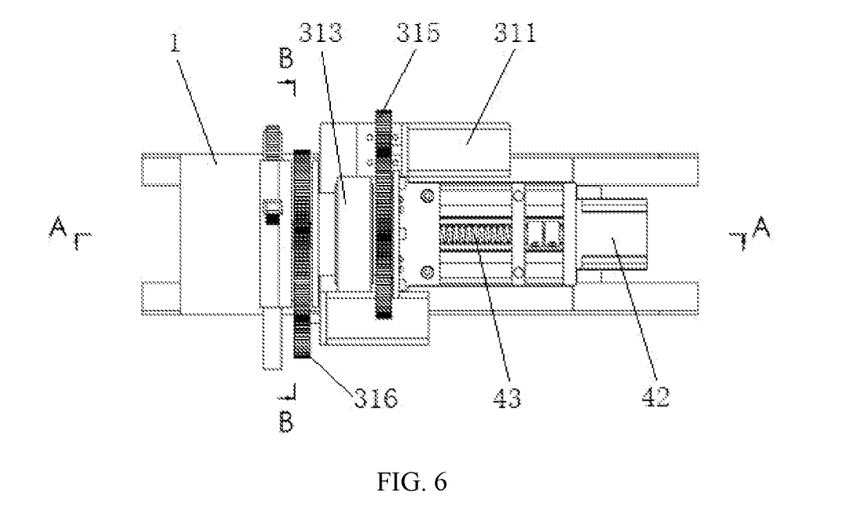
FIG. 6 is a top view illustrating a cutting unit and an infeed unit that are assembled together according to the present disclosure.

Referring to FIG. 1, the clamping unit 2 is mounted on the support 1, two clamping units 2 may be provided, and the two clamping units 2 are disposed at two ends of the support 1 to clamp the cable 10 firmly. Referring to FIG. 3 and FIG. 4, the clamping unit 2 includes a clamping holder 21 and two clamping jaws 22. The two clamping jaws 22 are slidably disposed on the clamping holder 21 and capable of moving towards each other to clamp the cable 10 firmly or away from each other to loosen the cable 10. In the present embodiment, the two clamping jaws 22 are slidable through the following structures: referring to FIG. 3 and FIG. 4, the clamping unit 2 further includes a rotatable rocker 25, a clamping gear 23 secured to an end of the rocker 25, and two clamping racks 24 disposed on two sides of the clamping gear 23 separately and engaged with the clamping gear 23. The clamping racks 24 are disposed vertically. Each of the clamping jaws 22 is secured to an end of the respective one of the clamping racks 24. When rotated, the rocker 25 drives the clamping gear 23 to rotate so that the clamping rack 24 moves upwards or downwards to drive the clamping jaws 22 to move upwards or downwards. It is to be noted that in the present embodiment, since the two clamping racks 24 are disposed on two sides of the clamping gear 23, the two clamping racks 24 are movable in opposite directions so that the two clamping jaws 22 can move towards or away from each other.

Referring to FIG. 4, each clamping jaw 22 optionally has a plate-shaped structure and is V-shaped or arc-shaped to match with the shape of the cable 10.

In the present embodiment, the rocker 25 may be rotated manually. That is, the rocker 25 may be rotated manually to clamp or loosen the clamping jaws 22. Alternatively, the rocker 25 may be driven by a driver such as a motor to rotate.

In the present embodiment, the clamping unit 2 further includes a lock bolt 26. The lock bolt 26 can lock the position of the rocker 25 to secure the position of the clamping jaws 22 so that the cable 10 is clamped by the clamping jaws 22 more stably and reliably. The lock bolt 26 may lock the rocker 25 by abutting against the rocker 25 at an end of the lock bolt 26 to make the rocker 25 unable to rotate or by using another structure as well as the lock bolt 26.

In the present embodiment, the cutting unit 3 is slidably disposed on the support 1, and the cutting unit 3 can cut the cable 10 so as to form the antistress cone. Alternatively, referring to FIG. 5 to FIG. 9, the cutting unit 3 includes a cutting holder 30, a driving assembly 31 mounted on the cutting holder 30, and a cutter 32 driven by the driving assembly 31. The driving assembly 31 can drive the cutter 32 to rotate and to move in a radial direction of the cable 10 so as to adjust a cutting depth. For example, the driving assembly 31 includes a first driver 311, a second driver 312 and a planetary gear set 313. The cutter 32 are driven by the planetary gear set 313 to rotate and to move in the radial direction of the cable 10, where the first driver 311 and the second driver 312 jointly drive the planetary gear set 313 to rotate so that the planetary gear set 313 drives the cutter 32 to rotate. In addition, the planetary gear set 313 can be driven by the first driver 311 and the second driver 312, to drive the cutter 32 to move in the radial direction of the cable 10 so as to adapt the cutting depth.

Referring to FIG. 5 to FIG. 9, optionally, the planetary gear set 313 includes a planet carrier 3131, a fixed gear 3132, a ring gear 3133, a planetary gear 3134 and a cutter driving gear 3135. One end of the fixed gear 3132 rotatably crosses the cutting holder 30 and is supported by the cutting holder 30, the fixed gear 3132 is driven by the first driver 311 to rotate at the same end, the other end of the planet carrier 3131 is securely sleeved on the fixed gear 3132 to rotate with the fixed gear 3132, and the planet carrier 3131 is used for supporting the ring gear 3133 and the planetary gear 3134.

Figure 8:
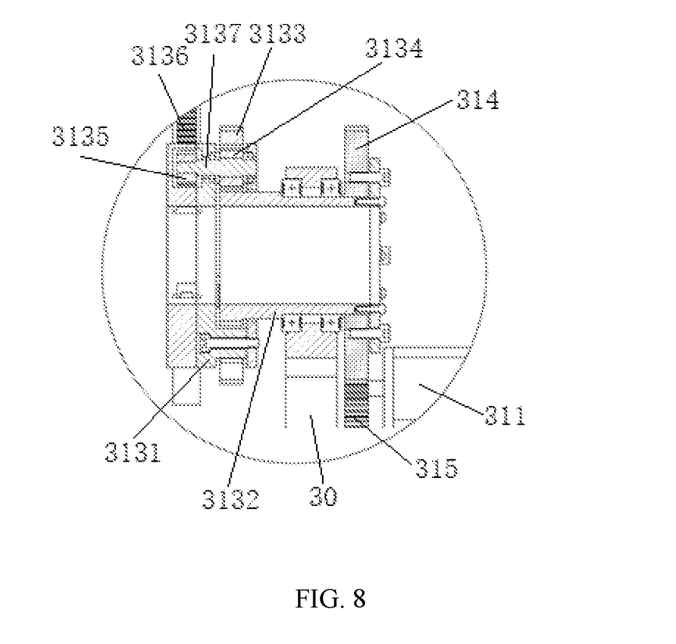
FIG. 8 is an enlarged view of part C of FIG. 7 of the present disclosure.
Figure 9:
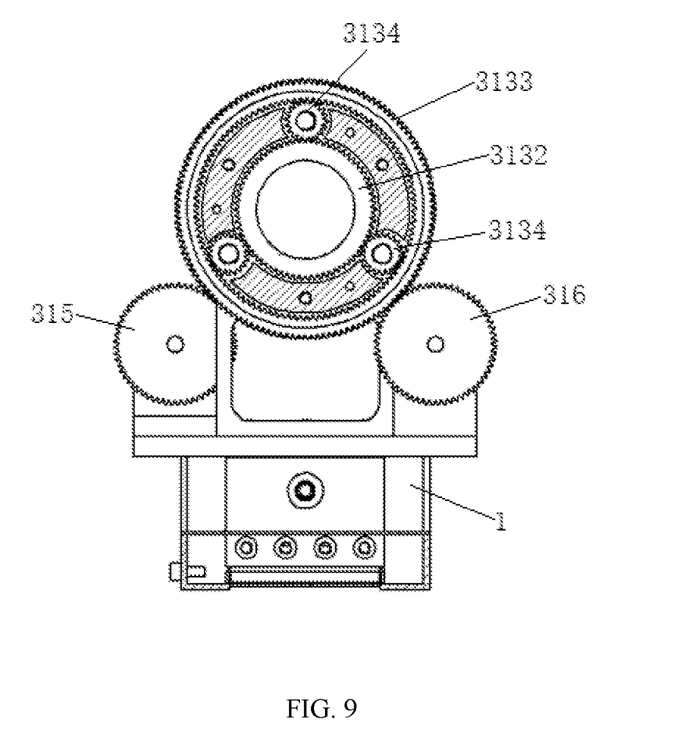
FIG. 9 is a sectional view taken along line B-B of FIG. 6 of the present disclosure.
Figure 10:
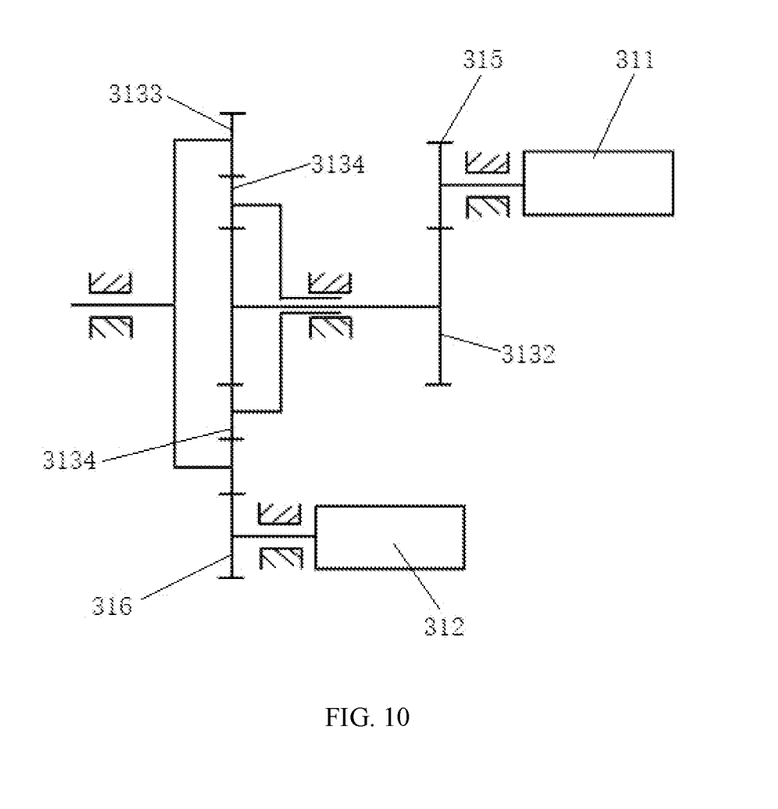
FIG. 10 is a schematic diagram illustrating the transmission of the cutting unit according to the present disclosure.

For example, referring to FIG. 8, the fixed gear 3132 may be a column-shaped structure. In the present embodiment, the driving assembly 31 may further includes a power input gear 314 and a first transmission gear 315. The power input gear 314 is engaged with the first transmission gear 315, the first transmission gear 315 is securely connected to an output end of the first driver 311, and the power input gear 314 is securely connected to the an end of the fixed gear 3132 through a fastener such as a bolt and capable of driving the fixed gear 3132 to rotate synchronously. In the present embodiment, teeth are disposed only on an end of the fixed gear 3132 away from the power input gear 314, and the remainder of the fixed gear 3132 is a slick rod.

The ring gear 3133 is sleeved on the other end of the fixed gear 3132 and can be driven by the second driver 312 to rotate. Optionally, referring to FIG. 6, the driving assembly 31 of the present embodiment may further include a second transmission gear 316. The second transmission gear 316 is securely connected to an output end of the second driver 312. The second transmission gear 316 is engaged with the external teeth of the ring gear 3133. The second driver 312 can drive the second transmission gear 316 to rotate so that the second transmission gear 316 can drive the ring gear 3133 to rotate.

The planetary gear 3134 is disposed between the fixed gear 3132 and the ring gear 3133 (referring to FIG. 8), and the planetary gear 3134 is engaged with the internal teeth of the fixed gear 3132 and the ring gear 3133, so that revolution and rotation of the planetary gear 3134 are achieved. The planetary gear 3134 is coaxially connected to the cutter driving gear 3135 through a gear shaft 3137, so that the planetary gear 3134 can drive the cutter driving gear 3135 to rotate synchronously. The cutter driving gear 3135 can be engaged with a rack 3136 secured to the cutter 32, so as to drive the rack 3136 to drive the cutter 32 in the radial direction so as to adapt the cutting depth.

In the present embodiment, a revolution speed and a rotation speed of the planetary gear 3134 are affected by rotation speeds of the ring gear 3133 and the fixed gear 3132 and numbers of teeth of the ring gear 3133 and the fixed gear 3132. In case that all the gear modules are the same, the rotation speed of the planetary gear 3134 $n_2$, the revolution speed of the planetary gear 3134 $n_H$, the rotation speed of the ring gear 3133 $n_1$, the number of teeth of the ring gear 3133 $z_1$, the rotation speed of the fixed gear 3132 $n_3$ and the number of teeth of the fixed gear 3132 $z_3$ satisfy the following equation:

$$n_2 = \frac{n_1 z_1 - n_3 z_3}{z_1 - z_3};$$

$$n_H = \frac{n_1 z_1 + n_3 z_3}{z_1 + z_3}.$$

In case that the rotation speed of the ring gear 3133 $n_1$, the number of teeth of the ring gear 3133 $z_1$, the rotation speed of the fixed gear 3132 $n_3$ and the number of teeth of the fixed gear 3132 $z_3$ satisfy the equation $n_1 z_1 = n_3 z_3$, the planetary gear 3134 merely revolves and doesn't rotate. The planetary gear 3134 drives the cutter driving gear 3135 through the gear shaft 3137. Since the planetary gear 3134 doesn't rotate, the rack 3136 doesn't move in the radial direction, namely feeding depth of the cutter 32 doesn't change. In case that $n_1 z_1 \neq n_3 z_3$, the planetary gear 3134 rotates, as a result the feeding depth of the cutter 32 changes so as to be adjusted to a required feeding depth. The revolution speed can be adjusted by adjusting rotating speeds of the first driver 311 and the second driver 312 as well. In response to the revolution speed being greater, a rotation speed of the cutter 32 is greater and the processed antistress cone is smoother.

The feeding depth and the rotation speed of the cutter 32 can be controlled by controlling the first driver 311 and the second driver 312, so that antistress cones with different requirements can be processed by the processing device of the present embodiment.

Figure 7:
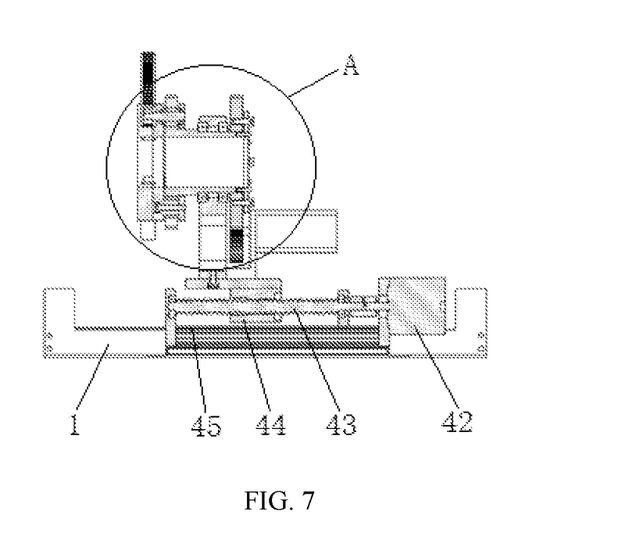
FIG. 7 is a sectional view taken along line A-A of FIG. 6 of the present disclosure.

In the present embodiment, referring to FIG. 2 and FIG. 7, the infeed unit 4 includes a support base 41, an infeed motor 42, a lead screw 43, a sliding block 44 and a slide rail 45. The support base 41 is securely mounted on the support 1. The infeed motor 42 is mounted on the support base 41. An output end of the infeed motor 42 is connected to the lead screw 43. The lead screw 43 is threaded to the sliding block 44. The sliding block 44 is slidably disposed on the slide rail 45. The slide rail 45 is securely mounted on the support 1. The cutting unit 3 is securely connected to the sliding block 44 (for example, the cutting holder 30 of the cutting unit 3 may be securely connected on the sliding block 44). The infeed motor 42 can drive the lead screw 43 to rotate so that the sliding block 44 can slide along the slide rail 45 and drive the cutting unit 3 to slide in the axial direction of the cable 10. In this manner, the cutting unit 3 can perform infeed and process the antistress cone.

In the present embodiment, the rotation speed of the infeed motor 42 can be controlled so that the infeed speed of the cutter 32 can be adjusted. In addition, the first driver 311 and the second driver 312 can control the infeed depth and the rotation speed of the cutter 32 so that the processing device of the present embodiment can adapt to the processing requirements of cables 10 with different measurements and produce antistress cones of different shapes by cutting.

When the device for processing an antistress cone of a main insulation layer of a cable of the present embodiment is used, the clamping unit 2 is adjusted according to the diameter of the cable 10 to clamp the two sides of the cable 10. At this time, the cable 10 crosses the cutting unit 3. Then, the cutter 32 of the cutting unit 3 is controlled to perform feeding to the preset cutting depth. After that, the cutter 32 is controlled to rotate and the infeed unit 4 is controlled to drive the cutting unit 3 to move in the axial direction. In this manner, the antistress cone is processed.

In the present disclosure, the clamping unit is used to clamp the cable so that the cable is stable when being processed and has a smooth surface and needs no further trimming after being cut. The cutting unit is used to cut the cable and the infeed unit is used to drive the cutting unit to move in the axial direction so that the antistress cone can be automatically processed and has a good quality after being formed. In addition, the cutting unit of the present disclosure drives, through the driving assembly, the cutter to move in the radial direction of the cable so that the processing device is applicable to the processing requirements of antistress cones with different measurements.

What is claimed is:

1. A device for processing an antistress cone of a main insulation layer of a cable, comprising:
    a support;
    a clamping unit mounted on the support and configured to clamp a cable;
    a cutting unit slidably disposed on the support, capable of cutting the cable in a radial direction of the cable, and capable of performing feeding in the radial direction of the cable to adjust a cutting depth; and an infeed unit connected to the cutting unit and configured to drive the cutting unit to slide in an axial direction of the cable so that the cutting unit performs feeding and cutting in the axial direction of the cable, wherein the cutting unit comprises a driving assembly and a cutter driven by the driving assembly to rotate;

wherein the driving assembly comprises a first driver, a second driver, and a planetary gear set jointly driven by the first driver and the second driver to rotate, wherein the planetary gear set is capable of driving the cutter to rotate synchronously and to move in the radial direction;

wherein the planetary gear set comprises a planet carrier, a fixed gear driven by the first driver to rotate, a ring gear driven by the second driver to rotate, a planetary gear engaged between the fixed gear and the ring gear, and a cutter driving gear driven by the planetary gear to rotate synchronously, wherein the cutter driving gear is engaged with a rack secured to the cutter, and the planet carrier is securely sleeved on the fixed gear to support the ring gear and the planetary gear.

2. The device for processing an antistress cone of a main insulation layer of a cable as claimed in claim 1, wherein the driving assembly further comprises a power input gear secured to the fixed gear, and an output end of the first driver is capable of driving the power input gear to rotate.

3. The device for processing an antistress cone of a main insulation layer of a cable as claimed in claim 1, wherein the clamping unit comprises a clamping holder and two clamping jaws, wherein the two clamping jaws are slidably disposed on the clamping holder and capable of moving towards and away from each other.

4. The device for processing an antistress cone of a main insulation layer of a cable as claimed in claim 3, wherein the clamping unit further comprises a rotatable clamping gear and two clamping racks engaged with the clamping gear, wherein each of the clamping jaws is connected to a respective one of the clamping racks.

5. The device for processing an antistress cone of a main insulation layer of a cable as claimed in claim 4, wherein the clamping unit further comprises a rocker configured to drive the clamping gear to rotate and a lock bolt configured to lock the rocker.

6. The device for processing an antistress cone of a main insulation layer of a cable as claimed in claim 3, wherein the infeed unit comprises a support base secured to the support, an infeed motor mounted on the support base, a lead screw driven by the infeed motor to rotate, a sliding block threaded to the lead screw and securely connected to the cutting unit, and a slide rail secured to the support, wherein the sliding block is slidably disposed on the slide rail.

* * * * *